(12) United States Patent
Tanimukai et al.

(10) Patent No.: US 10,674,051 B2
(45) Date of Patent: Jun. 2, 2020

(54) ACTUATOR DRIVER

(71) Applicant: ROHM CO., LTD., Kyoto-shi, Kyoto (JP)

(72) Inventors: Hiromichi Tanimukai, Kyoto (JP); Akihito Saito, Kyoto (JP); Jun Maede, Kyoto (JP); Yoshihiro Sekimoto, Kyoto (JP)

(73) Assignee: ROHM CO., LTD., Tokyo (JP)

( * ) Notice: Subject to any disclaimer, the term of this patent is extended or adjusted under 35 U.S.C. 154(b) by 0 days.

(21) Appl. No.: 16/051,813

(22) Filed: Aug. 1, 2018

(65) Prior Publication Data

US 2019/0045095 A1 Feb. 7, 2019

(30) Foreign Application Priority Data

Aug. 1, 2017 (JP) .................................. 2017-149229

(51) Int. Cl.
| | |
|---|---|
| *H04N 5/225* | (2006.01) |
| *G02B 7/04* | (2006.01) |
| *H04N 5/232* | (2006.01) |
| *G02B 27/64* | (2006.01) |
| *G02B 7/08* | (2006.01) |

(52) U.S. Cl.
CPC ............. *H04N 5/2254* (2013.01); *G02B 7/04* (2013.01); *G02B 7/08* (2013.01); *G02B 27/646* (2013.01); *H04N 5/23212* (2013.01); *H04N 5/23258* (2013.01); *H04N 5/23287* (2013.01); *H04N 5/2252* (2013.01)

(58) Field of Classification Search
CPC ...................................................... H04N 5/2254
USPC ......................................................... 348/345
See application file for complete search history.

(56) References Cited

U.S. PATENT DOCUMENTS

| | | | |
|---|---|---|---|
| 2005/0276590 A1* | 12/2005 | Ishikawa ............. | G02B 27/646 396/55 |
| 2014/0354780 A1* | 12/2014 | Matsuura .............. | G03B 35/08 348/47 |

FOREIGN PATENT DOCUMENTS

JP             2013003301 A      1/2013

* cited by examiner

*Primary Examiner* — Joel W Fosselman

(74) *Attorney, Agent, or Firm* — Cantor Colburn LLP

(57) ABSTRACT

An actuator positions a movable portion including a lens in a first direction (Z-axis direction). An acceleration sensor generates first acceleration information ACC that indicates the acceleration applied to the image capture apparatus in the first direction. An actuator driver IC superimposes a correction value that corresponds to the first acceleration information on a base instruction value that corresponds to the target position to be set for the lens in the first direction. The actuator driver IC controls the actuator according to a corrected instruction value thus obtained.

6 Claims, 9 Drawing Sheets

ACTUATOR DRIVER

CROSS-REFERENCE TO RELATED APPLICATION

The present application claims priority under 35 U.S.C. § 119 to Japanese Patent Application No. 2017-149229, filed on Aug. 1, 2017, the entire contents of which are incorporated herein by reference.

BACKGROUND OF THE INVENTION

1. Field of the Invention

The present invention relates to an actuator driver and an image capture apparatus employing the actuator driver.

2. Description of the Related Art

In recent years, in almost all cases, a mobile device such as a cellular phone terminal, tablet terminal, or the like, mounts a camera. In particular, in the great majority of cases, such a camera has an autofocus (AF) function. Typically, such a camera having an AF function includes an actuator for adjusting the extension position of a lens according to the position of the subject. As such an actuator, actuators employing a voice coil motor (VCM) method have become mainstream. Also, various kinds of methods have been proposed and developed, examples of which include a method employing a piezo element, a method employing a shape memory alloy member, etc. Furthermore, known examples employing the VCM method include an arrangement in which a movable portion is supported by a spring, etc., is guided by a ball, and so on. In any case, such an arrangement employs a basic mechanism in which electrical energy is supplied by applying voltage, current, or the like, by means of an actuator driver, and the electrical energy thus supplied is converted into a force so as to move a movable portion.

In the AF control operation, the focal position to be set as a target position is determined using a contrast method, a phase difference detection method, or the like, and a movable portion (image capture lens) is controlled such that it reaches the target position. However, even if the movable position is set to the target position by applying a predetermined voltage or current, it can be considered that deviation can occur in the position of the movable portion due to the effect of gravitational force, which is an external force. Accordingly, such an arrangement requires appropriate correction.

Patent document 1 (Japanese Patent Application Laid Open No. 2013-3301) discloses a technique in which the direction of gravitational force is detected, and the current value to be used to set a lens to a predetermined position is corrected based on the direction of gravitational force thus detected. Specifically, a technique is disclosed in which the direction of gravitational force is detected, and a current value correction coefficient is calculated based on the direction of gravitational force so as to correct the current value.

As a result of investigating a control operation for controlling the lens position, the present inventor has come to recognize the following problem. The technique described in Patent document 1 is designed assuming that the image capture apparatus is in a stationary state. When the image capture apparatus is subjected to acceleration, this arrangement is not capable of correcting the lens position with high precision.

SUMMARY OF THE INVENTION

The present invention has been made in view of such a situation. Accordingly, it is an exemplary purpose of an embodiment of the present invention to provide an image capture apparatus that is capable of positioning the lens with high precision even if the image capture apparatus is subjected to acceleration.

An embodiment of the present invention relates to an image capture apparatus. The image capture apparatus comprises: an image sensor; a lens arranged on an incident light path to the image sensor; an actuator structured to position a movable portion comprising the lens in a first direction; an acceleration detection unit structured to generate first acceleration information that indicates an acceleration applied to the image capture apparatus in the first direction; and an actuator driver structured to superimpose a correction value that corresponds to the first acceleration information on a base instruction value that corresponds to a target position to be set for the lens in the first direction, and to control the actuator according to a corrected instruction value obtained thereby.

With such an embodiment, this arrangement is capable of reducing the effects of a force that occurs at the lens due to gravitational force in a stationary state of the image capture apparatus. Furthermore, when the image capture apparatus is subjected to accelerated motion by means of an external force, this arrangement allows the effects of inertial force to be reduced.

Also, the actuator driver may be controlled in an open-loop control manner.

In a case of employing a closed-loop control operation (feedback control operation), a servomotor is controlled such that the position detection signal approaches the target value. Accordingly, it can be said that such an arrangement originally provides high stability to the lens with respect to an external force. In contrast, by combining the correction made based on the first acceleration information with the open-loop control operation, this arrangement provides the lens with improved stability with respect to an external force.

The actuator driver may be controlled in a closed-loop control manner.

In a case of employing such a closed-loop control operation, such an arrangement originally provides the lens with high tolerance with respect to position deviation of the lens due to external force. However, the closed-loop control operation may be combined with the correction based on the first acceleration information.

Also, the first direction may be an optical-axis direction of the lens. That is to say, the correction based on the first acceleration information may be employed for an autofocus lens position control operation. This provides the AF function with improved stability.

Also, the acceleration detection unit may further generate second acceleration information that indicates the acceleration applied to the image capture apparatus in a second direction that is orthogonal to the first direction. Also, the actuator driver may superimpose a correction value that corresponds to the second acceleration information on a base instruction value that corresponds to the target position to be set for the lens in the second direction. Also, the actuator driver may control the actuator according to a corrected instruction value thus obtained.

Also, the first direction and the second direction may each be defined to be orthogonal to the optical axis of the lens. That is to say, correction based on the first and second acceleration information may be employed to control the lens position for image stabilization correction. This provides the image stabilization correction with improved stability.

Another embodiment of the present invention relates to an actuator driver to be mounted on an image capture apparatus. The image capture apparatus comprises: an image sensor; a lens arranged on an incident light path to the image sensor; an actuator structured to position a movable portion comprising the lens in a first direction; and an acceleration detection unit structured to generate first acceleration information that indicates an acceleration applied to the image capture apparatus in the first direction. The actuator driver comprises: a control circuit structured to superimpose a correction value that corresponds to the first acceleration information on a base instruction value that corresponds to a target position to be set for the lens in the first direction, so as to generate a corrected instruction value; and a driving unit structured to control the actuator according to the corrected instruction value.

It is to be noted that any arbitrary combination or rearrangement of the above-described structural components and so forth is effective as and encompassed by the present embodiments. Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
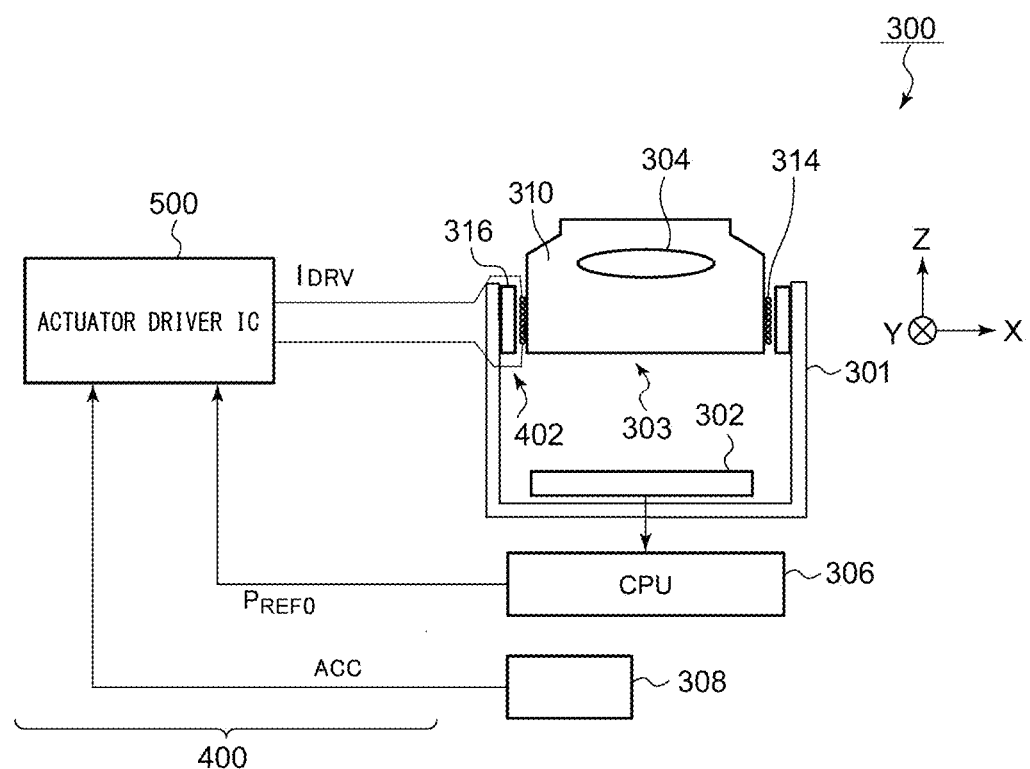
FIG. 1 is a diagram showing an image capture apparatus according to a first embodiment.

The invention will now be described based on preferred embodiments which do not intend to limit the scope of the present invention but exemplify the invention. All of the features and the combinations thereof described in the embodiment are not necessarily essential to the invention.

In some cases, the sizes (thickness, length, width, and the like) of each component shown in the drawings are expanded or reduced as appropriate for ease of understanding. The size relation between multiple components in the drawings does not necessarily match the actual size relation between them. That is to say, even in a case in which a given member A has a thickness that is larger than that of another member B in the drawings, in some cases, in actuality, the member A has a thickness that is smaller than that of the member B.

In the present specification, the state represented by the phrase "the member A is coupled to the member B" includes a state in which the member A is indirectly coupled to the member B via another member that does not substantially affect the electric connection between them, or that does not damage the functions or effects of the connection between them, in addition to a state in which they are physically and directly coupled.

Similarly, the state represented by the phrase "the member C is provided between the member A and the member B" includes a state in which the member A is indirectly coupled to the member C, or the member B is indirectly coupled to the member C via another member that does not substantially affect the electric connection between them, or that does not damage the functions or effects of the connection between them, in addition to a state in which they are directly coupled.

First Embodiment

Description will be made in the present embodiment regarding an image capture apparatus. FIG. 1 is an image capture apparatus 300 according to a first embodiment. The image capture apparatus 300 is configured as a digital still camera, a digital video camera, or a camera module built into a smartphone or a tablet terminal. The image capture apparatus 300 includes an image sensor 302, a lens 304, a processor 306, an acceleration sensor 308, and a lens control apparatus 400. The lens 304 is arranged on an optical axis of light to be input to the image sensor 302. The lens 304 is configured as an autofocus (AF) lens. The lens control apparatus 400 sets the position of the lens 304 in the optical axis direction (Z-axis direction) thereof according to a position instruction value (which will also be referred to as a "target code") $P_{REF0}$ received from the processor 306.

The processor 306 generates the position instruction value $P_{REF0}$ such that an image captured by the image sensor 302 exhibits high contrast (contrast AF). Alternatively, the processor 306 is arranged as an external circuit of the image sensor 302. Also, the position instruction value $P_{REF0}$ may be generated based on the output of the AF sensor embedded in an image capture face (phase difference AF).

The lens control apparatus 400 includes an actuator 402 and an actuator driver IC (Integrated Circuit) 500. The actuator 402 is configured as a voice coil motor using the magnetic interaction between a coil 314 and a permanent magnet 316. The coil 314 may be configured such that it is wound around a lens holder 310 that supports the lens 304. The lens 304, the lens holder 310, and the coil 314 form an AF movable portion 303. The permanent magnet 316 is arranged on a stationary portion side of the voice coil motor such that it faces the coil 314. The stationary portion of the actuator 402 is fixed with respect to a housing 301 of the image capture apparatus 300. It should be noted that FIG. 1 shows an actuator driver IC 500 as an external unit of the housing 301. Also, the actuator driver IC 500 may be provided within the housing 301.

The actuator driver IC 500 controls a driving current $I_{DRV}$ to be applied to the actuator 402 according to the position instruction value $P_{REF0}$. It should be noted that the current value to be applied for a predetermined position is determined by means of calibration performed for a given orientation (i.e., given gravitational acceleration). For example, in a case in which the calibration is performed with an orientation in which gravitational force is applied in a direction that is orthogonal to the optical axis, the relation between the position and the current value is determined under this condition. Subsequently, if gravitational force is applied to the movable portion 303 in the optical axis direction due to a change in orientation, or if acceleration is applied due to external disturbance vibration, i.e., if inertial force is applied, the relation between the position and the current determined in the calibration changes.

Referring to a mechanical model of the image capture apparatus 300, description will be made regarding the effects of gravitational force and external force.

Figure 2:
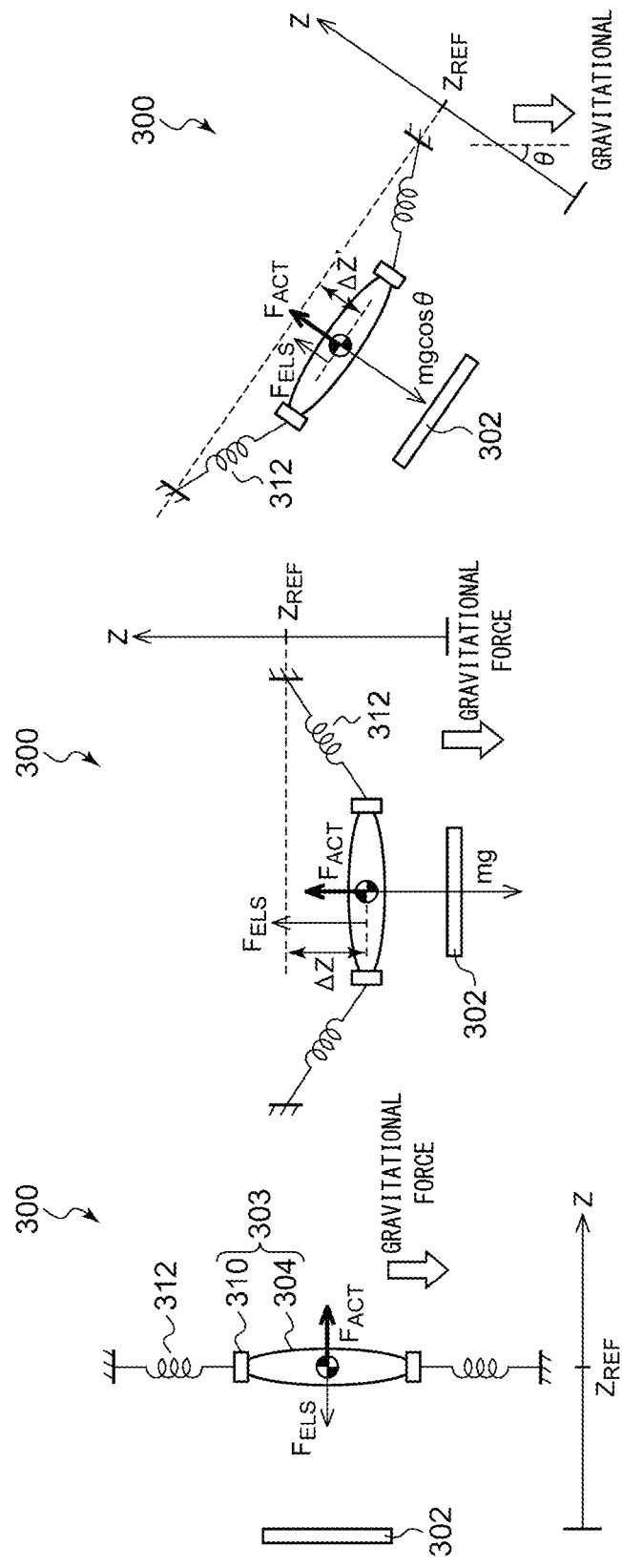
FIG. 2A through FIG. 2C are diagrams each showing effects of gravitational force on an AF system.

FIGS. 2A through 2C are diagrams for explaining the effect of gravitational force on the AF system. The movable portion 303 is supported by a spring 312. The spring 312 is structured such that it readily changes shape in the optical axis direction. In contrast, the spring 312 exhibits only a slight change in shape even if gravitational force is applied in a direction that is orthogonal to the optical axis. That is to say, it can be understood that the AF system of the image capture apparatus 300 represents an elastic model. An unshown actuator 402 positions the movable portion 303 including the lens 304 in the optical axis direction (Z-axis direction). It should be noted that, in FIGS. 2A through 2C, the spring 312 also generates a force in the Z-axis direction. The elastic force generated by the spring 312 in the Z-axis direction will be represented by the elastic force $F_{ELS}$. Description will be made with reference to FIGS. 2A through 2C assuming that no external force is applied except for gravitational force, and assuming that the image capture apparatus 300 (AF system) is in a stationary state or otherwise is moved at a constant velocity.

FIG. 2A shows a case in which gravitational force is applied in a direction that is orthogonal to the movable direction (Z-axis direction) of the movable portion 303. In this case, the gravitational force has no effect on deviation of the position of the movable portion 303. The force $F_{ACT}$ generated by the actuator 402 and the elastic force $F_{ELS}$ of the spring 312 are applied to the movable portion 303. The movable portion 303 comes to a stop at a balanced position between them.

In many cases, the system is calibrated with the state shown in FIG. 2A as a reference, i.e., with a state involving no effect of gravitational force (which will be referred to as the "standard state") as a reference. In this state, such an arrangement derives the driving current $I_{DRV}$ required to position the movable portion 303 to a target position (target displacement) $Z_{REF}$. For example, the relation between the position and the driving current $I_{DRV}$ is derived such that, when the driving current $I_{DRV}$=0, the focus is set to infinity.

In actual operation, the driving current $I_{DRV}$ that corresponds to the target code $P_{REF0}$ that indicates the target position $Z_{REF}$ is supplied to the actuator 402 so as to position the movable portion 303 to the target position $Z_{REF}$.

FIG. 2B shows a case in which gravitational force is applied in a direction that is in parallel with the movable direction (Z-axis direction) of the movable portion 303. In this case, gravitational force (m·g) is applied to the movable portion 303 in addition to the force $F_{ACT}$ generated by the actuator 402 and the elastic force $F_{ELS}$ generated by the spring 312. Here, "m" represents the mass of the movable portion 303, and "g" represents gravitational acceleration. In a case of supplying the driving current $I_{DRV}$ determined with the standard state as a reference without applying any correction for gravitational force, the position of the movable portion 303 deviates by ΔZ from the target position $Z_{REF}$ due to the gravitational force (m·g).

FIG. 2C shows a case in which gravitational force is applied in a direction that deviates by θ with respect to the movable direction (Z-axis direction) of the movable portion 303. In this case, the Z-axis component of the gravitational force applied to the movable portion 303 is represented by (m·g·cos θ). In a case of supplying the driving current $I_{DRV}$ determined with the standard state as a reference without applying any correction for gravitational force, the position of the movable portion 303 deviates by ΔZ' from the target position $P_{REF}$ due to the gravitational force (m·g·cos θ). The case shown in FIG. 2B corresponds to a case shown in FIG. 2C in which θ is set to 0 degrees.

Figure 3:
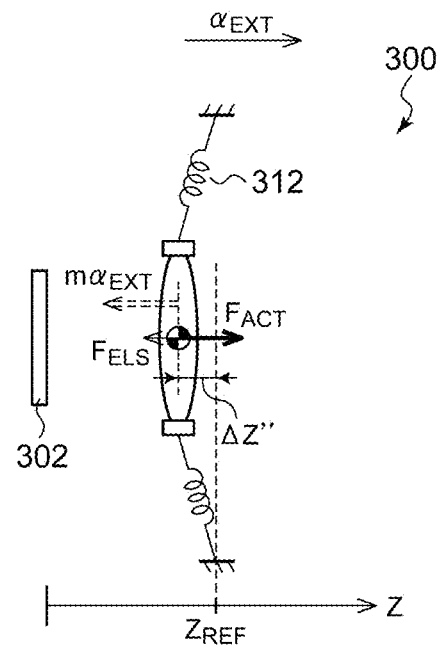
FIG. 3 is a diagram for explaining the effects of an external force other than gravitational force on the AF system.

FIG. 3 is a diagram for explaining the effects on the AF system of an external force that differs from gravitational force. When the image capture apparatus 300 is subjected to accelerated motion at an acceleration $\alpha_{EXT}$ in the Z-axis direction, an inertial force $F_1$ is applied to the movable portion 303 due to the acceleration $\alpha_{EXT}$. The movable portion 303 also deviates by ΔZ" from the target position $Z_{REF}$ due to the inertial force $F_1$. The inertial force $F_1$ is represented by $F_1 = m \cdot \alpha_{EXT}$.

The image capture apparatus 300 according to the embodiment has a function of correcting the effect of the inertial force accompanying the accelerated motion of the overall image capture apparatus 300 itself as shown in FIG. 3 in addition to the effects of gravitational force as shown in FIGS. 2B and 2C. Description will be made below regarding such a correction function.

As described above with reference to FIGS. 2B and 2C or FIG. 3, when acceleration is externally applied to the movable portion 303, force is applied to the movable portion 303 so as to change the position thereof regardless of whether the acceleration is applied in the form of a DC component or an AC component.

The actuator driver IC 500 corrects the current value to be applied to the actuator 402 so as to cancel out the effects of acceleration due to external disturbance vibration in addition to gravitational acceleration.

The equation of motion of the movable portion 303 in the Z-axis direction is represented by the following Expression.

$$m \cdot \alpha = F_{ACT} + F_{ELS} + m \cdot (g \cdot \cos\theta + \alpha_{EXT})$$
$$= F_{ACT} + F_{ELS} + m \cdot \alpha_Z$$

Here, "α" represents the acceleration of the movable portion 303 itself, which is by no means to be regarded as the acceleration $\alpha_{EXT}$ of the overall image capture apparatus 300 itself. The third term in the right side, i.e., the term $m \cdot (g \cdot \cos\theta + \alpha_{EXT}) = m \cdot \alpha_Z$ corresponds to the effects of external force due to gravitational force, external disturbance vibration, or the like. It should be noted that $\alpha_Z = (g \cdot \cos\theta + \alpha_{EXT})$. That is to say, $\alpha_Z$ represents the acceleration applied to the image capture apparatus 300 itself in the Z-axis direction. It should be noted that the terms $F_{ACT}$, $F_{ELS}$, θ, and $\alpha_{EXT}$ each take a positive value or a negative value depending on the direction of the force.

The actuator driver IC 500 corrects the driving current $I_{DRV}$ so as to reduce the effect due to the term $(m \cdot \alpha_Z)$, thereby correcting the force to be generated by the actuator 402. Description will be made with the driving current that corresponds to the target code $P_{REF0}$ determined in the standard state as $I_{DRV0}$, and with the force generated in this state as $F_{ACT0}$. The actuator driver IC 500 superimposes a correction component $\Delta I_{DRV}$ on the driving current $I_{DRV}$ such that the actuator 402 generates a force represented by $F_{ACT} = F_{ACT0} - (m \cdot \alpha_Z)$.

This allows the effects of gravitational force and external force to be reduced, thereby reducing the deviation $\Delta Z$ from the target position $Z_{REF}$ of the movable portion 303.

Returning to FIG. 1, the acceleration sensor 308 detects the acceleration applied to the image capture apparatus 300. The acceleration sensor 308 outputs, to the image capture apparatus 300, acceleration information ACC that indicates the acceleration $\alpha_Z$ applied in the movable direction (Z-axis direction) of the actuator 402.

The acceleration sensor 308 may be arranged at a position such that it is able to detect the acceleration applied to the image capture apparatus 300. For example, the acceleration sensor 308 may be arranged within the image capture apparatus 300. Also, the acceleration sensor 308 may be mounted on an electronic device mounting the image capture apparatus 300. Also, the acceleration sensor 308 may be built into the actuator driver IC 500. It should be noted that the force applied to the lens 304 is calculated based on the acceleration thus detected. Accordingly, the acceleration sensor 308 is preferably arranged in the vicinity of the lens 304. The acceleration may be detected in three axis directions, i.e., the X-axis direction, the Y-axis direction, and the Z-axis direction. Description will be made regarding an example in which the acceleration $\alpha_Z$ is detected in the Z-axis direction, which is the optical axis direction. The acceleration sensor 308 outputs the acceleration information ACC, which is input to the actuator driver IC 500. The acceleration information ACC also includes an AC component such as an acceleration component that occurs due to external disturbance vibration or the like in addition to a constant DC component such as a gravitation component. Thus, the acceleration information ACC is represented by $(g \cdot \cos \theta + \alpha_{EXT})$. That is to say, by correcting the position based on the acceleration $\alpha_Z$, this arrangement is capable of correcting the position deviation (FIGS. 2B and 2C) when the image capture apparatus 300 is in the stationary state or is moved at a constant velocity. Furthermore, this arrangement is capable of correcting the position deviation (FIG. 3) when the overall image capture apparatus 300 itself is subjected to accelerated motion. Moreover, this arrangement is capable of correcting a combination thereof, i.e., of correcting the position deviation when the image capture apparatus 300 is subjected to accelerated motion in the Z-axis direction and gravitational force is applied in the Z-axis direction.

Figure 4:
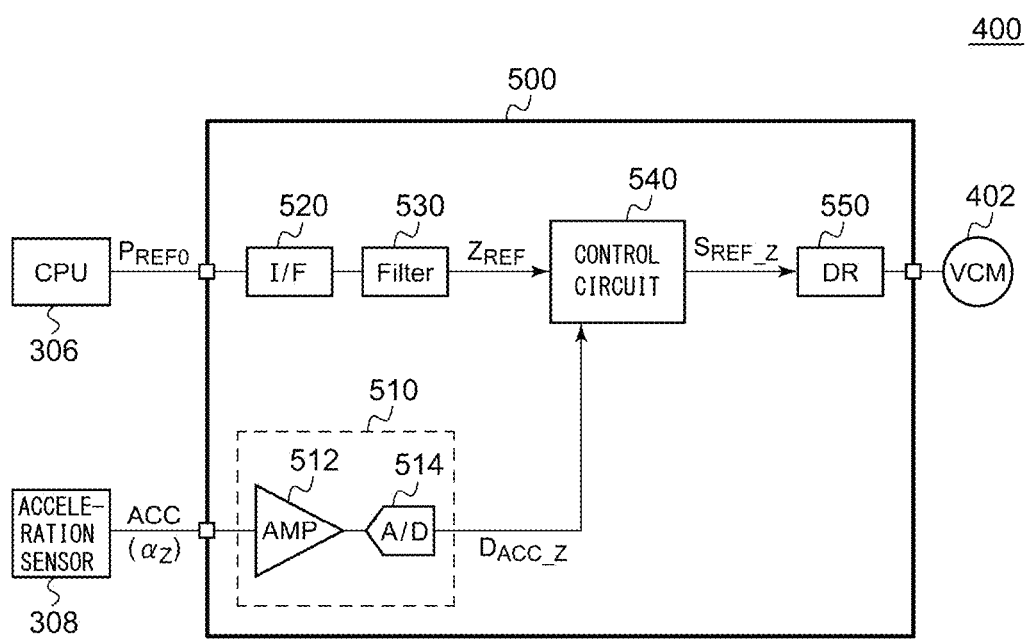
FIG. 4 is a block diagram showing a lens control apparatus including an actuator driver IC.

Next, description will be made regarding a system configuration of the lens control apparatus 400 including the actuator driver IC 500. FIG. 4 is a block diagram showing the lens control apparatus 400 including the actuator driver IC 500. The actuator driver IC 500 is configured as a function IC integrated on a single semiconductor substrate. Examples of such an "integrated" arrangement include: an arrangement in which all the circuit components are formed on a semiconductor substrate; and an arrangement in which principal circuit components are monolithically integrated. Also, a part of the circuit components such as resistors and capacitors may be arranged in the form of components external to such a semiconductor substrate in order to adjust the circuit constants. By integrating the circuit on a single chip, such an arrangement allows the circuit area to be reduced, and allows the circuit elements to have uniform characteristics.

The acceleration information ACC detected by the acceleration sensor 308 is input to the actuator driver IC 500. In this example, the acceleration information ACC is configured in the form of an analog voltage, which will also be referred to as the "acceleration detection signal ACC". An acceleration detection unit 510 generates a digital acceleration detection value $D_{ACC\_Z}$ that indicates the acceleration $\alpha_Z$ applied to the movable portion 303. The acceleration detection unit 510 includes an amplifier 512 that amplifies the acceleration detection signal ACC, and an A/D converter 514 that converts the output of the amplifier 512 into the acceleration detection value $D_{ACC\_Z}$ in the form of a digital value.

The interface circuit 520 receives a target code TC ($P_{REF0}$ in FIG. 1) that indicates the movable position target position $Z_{REF}$ of the movable portion of the actuator 402 from the processor 306. For example, the interface circuit 520 may be configured as a serial interface such as an I²C (Inter IC) or the like. A filter 530 filters the target code TC received by the interface circuit 520, so as to generate the position instruction value $Z_{REF}$. If the position instruction value $Z_{REF}$ suddenly changes, this has the potential to cause ringing in the position of the lens 304. By providing the filter 530, this arrangement is capable of suppressing the occurrence of such ringing.

A control circuit 540 determines a current instruction value (base instruction value) $I_0$ that corresponds to the position instruction value $Z_{REF}$ based on the relation between the current and the position of the lens 304 (movable portion 303) determined in the calibration. Furthermore, the control circuit 540 calculates a current instruction value (correction value) $I_{CMP\_Z}$ such that the actuator 402 generates a thrust force so as to cancel out the force (inertial force and gravitational force) that occurs at the movable portion 303 due to the acceleration $\alpha_Z$. Subsequently, the control circuit 540 calculates a current value (correction instruction value) $S_{REF\_Z}$ by superimposing the correction instruction value $I_{CMP\_Z}$ on the base instruction value $I_0$, and inputs the correction instruction value $S_{REF\_Z}$ thus calculated to the driver 550. The driver 550 drives the actuator 402 according to the correction instruction value $S_{REF\_Z}$ thus calculated.

Description will be made regarding a current value to be used to cancel out the inertial force due to externally applied acceleration. With the acceleration applied to the image capture apparatus 300 as "$\alpha_Z$", and with the mass of the movable portion 303 as "m", the force (inertial force) $F_1$ that occurs due to the acceleration $\alpha_Z$ is represented by the following Expression.

$$F_1 = m \cdot \alpha_Z \tag{1}$$

On the other hand, in a case in which the actuator 402 is configured as a voice coil motor, typically, the generated thrust force $F_2$ is represented by the following Expression (2).

$$F_2 = B \cdot I \cdot L \tag{2}$$

Here, "B" represents the magnetic flux density, "I" represents the applied current, and "L" represents the overall effective length of the coil. The correction current value to be used for generating the thrust force so as to cancel out the inertial force and the gravitational force can be calculated based on the following Expression.

$$I_{CMP\_Z} = m \cdot \alpha_Z/(B \cdot L) \quad (3)$$

There is some individual variation in the parameters m, B, and L. However, basically, such parameters are each configured as a constant that can be designed. Thus, the relation between the acceleration $\alpha_Z$ and the correction current $I_{CMP\_Z}$ can be determined.

Next, description will be made regarding an example of the calculation of the base current value $I_0$ to be used for positioning that corresponds to the position instruction value $Z_{REF}$. The stroke sensitivity S of the actuator is preferably acquired in the calibration step. The stroke sensitivity S is a constant that represents the slope of the displacement with respect to the applied current. By acquiring the stroke sensitivity S, the change in the current $I_0$ to be used for providing the displacement x can be calculated based on the following Expression.

$$I_0 = x/S \quad (4)$$

In a case in which the current value is calculated based on the design values instead of using the stroke sensitivity S, the balance between the generated thrust force and the force due to the spring is represented by the following Expression.

$$B \cdot I_0 \cdot L = k \cdot x \quad (5)$$

Accordingly, the change in current $I_0$ to be applied can be calculated based on the following Expression.

$$I_0 = k \cdot x/(B \cdot L) \quad (6)$$

Here, "k" represents a spring constant. Also, the spring constant k can be calculated based on the following Expression using the measurement value of the resonance frequency $f_0$.

$$k = m \cdot (2 \cdot \pi \cdot f_0)^2 \quad (7)$$

By superimposing the correction current $I_{CMP\_Z}$ on the base current $I_0$ by means of the calculation as described above, i.e., by adding or otherwise subtracting $I_{CMP\_Z}$ to or from $I_0$ depending on the direction in which the acceleration $\alpha_Z$ is applied, the corrected current value $S_{REF\_Z}$ is calculated, which is output to the driver 550. With such a method described above, this arrangement provides improved tolerance with respect to lens position deviation due to external force.

The above is the configuration of the image capture apparatus 300. Next, description will be made regarding the operation thereof.

Correction of Effects of Gravitational Force

Figure 5A:
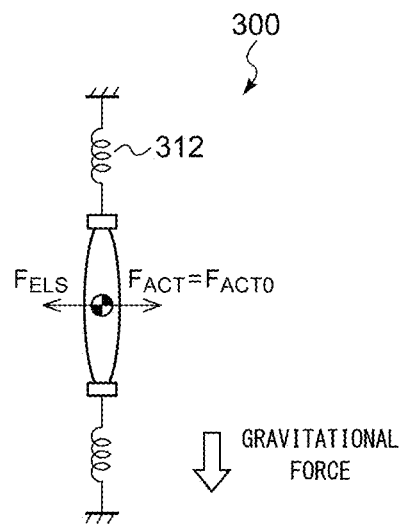
FIG. 5A and FIG. 5B are diagrams for explaining correction of the effects of gravitational force.
Figure 5B:
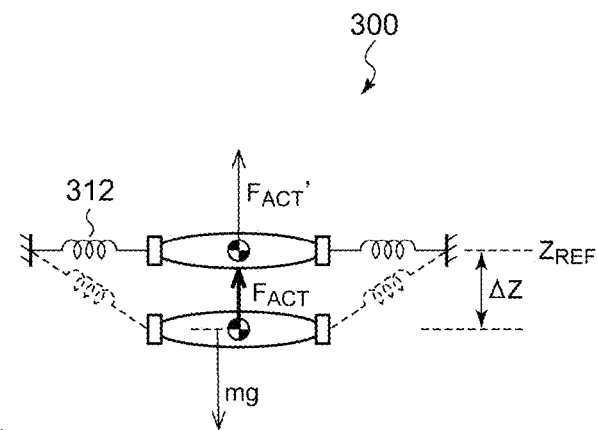

Description will be made regarding correction of effects of gravitational force with reference to FIGS. 5A and 5B. FIGS. 5A and 5B are diagrams each showing correction of the effects of gravitational force. Description will be made assuming that the calibration is performed in a state in which gravitational force is applied in a direction that is orthogonal to the optical axis of the lens 304. In this state, the acceleration sensor 308 does not detect the acceleration in the optical-axis direction ($\alpha_Z=0$). Accordingly, in this state, the correction current $I_{CMP\_Z}$ is set to zero, and the force $F_{ACT}$ to be generated by the actuator 402 is equal to $F_{ACT0}$. Thus, the mechanical state is equivalent to that shown in FIG. 2A, and the movable portion 303 is set to the target position $Z_{REF}$.

FIG. 5B shows a case in which the orientation is changed such that gravitational force is applied in the optical-axis direction. The dashed line shows a state in which the correction is disabled. In this state, the movable portion 303 receives the gravitational force (m·g). The movable portion 303 is positioned up to a position at which there is a balance between the gravitational force and the reaction force generated by the spring. With the displacement of the movable portion 303 as ΔZ, the following Expression holds true.

$$\Delta Z = (m \cdot g)/k \quad (8)$$

That is to say, if only the base current $I_0$ is applied in this orientation thus changed, this leads to position deviation of ΔZ. Also, by substituting Expression (7) into Expression (8), the position deviation can be represented by the following Expression.

$$\Delta Z = g/(2 \cdot \pi \cdot f_0)^2 \quad (9)$$

With the image capture apparatus 300 according to the embodiment, by applying the thrust force $F_{ACT}'$ so as to cancel out the gravitational force (m·g), this arrangement is capable of correcting the position as indicated by the solid line. That is to say, it is needless to say that the acceleration sensor 308 detects the gravitational acceleration g. By adding the current $I_{CMP\_Z}$ obtained by substituting g into $\alpha$, this arrangement is capable of correcting the position.

Description has been made with reference to FIGS. 5A and 5B with extreme orientations. However, this arrangement supports position correction in intermediate orientations. In an intermediate orientation, the acceleration detected by the acceleration sensor 308 is an intermediate value between g and 0. The current value may preferably be corrected based on Expression (3) using the acceleration $\alpha_Z$ detected by the acceleration sensor 308.

Correction of Effects of Inertial Force

Figure 6:
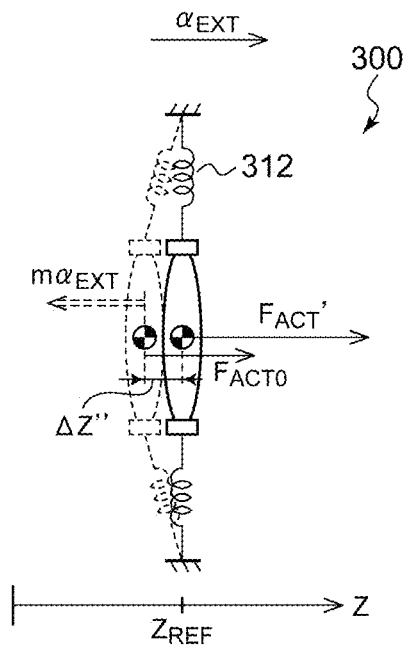
FIG. 6 is a diagram for explaining the effects of inertial force.

Next, description will be made regarding correction of the effects of inertial force. FIG. 6 is a diagram for explaining the effects of inertial force. The dashed line shows a state in which the correction is disabled. When the overall image capture apparatus 300 itself is moved at an acceleration rate $\alpha_{EXT}$, the movable portion 303 receives the inertial force (m·$\alpha_{EXT}$). If the correction is disabled, the movable portion 303 deviates by ΔZ" from the target position $Z_{REF}$.

With the image capture apparatus 300 according to the embodiment, by applying the thrust force $F_{ACT}'$ so as to cancel out the inertial force (m·$\alpha_{EXT}$), this arrangement is capable of correcting the position as indicated by the solid line. That is to say, the acceleration $\alpha_Z$ detected by the acceleration sensor 308 matches the acceleration aExr. Accordingly, by adding the current $I_{CMP\_Z}$ obtained by substituting $\alpha_Z$ into a in Expression (3), this arrangement is capable of correcting the position.

Figure 7:
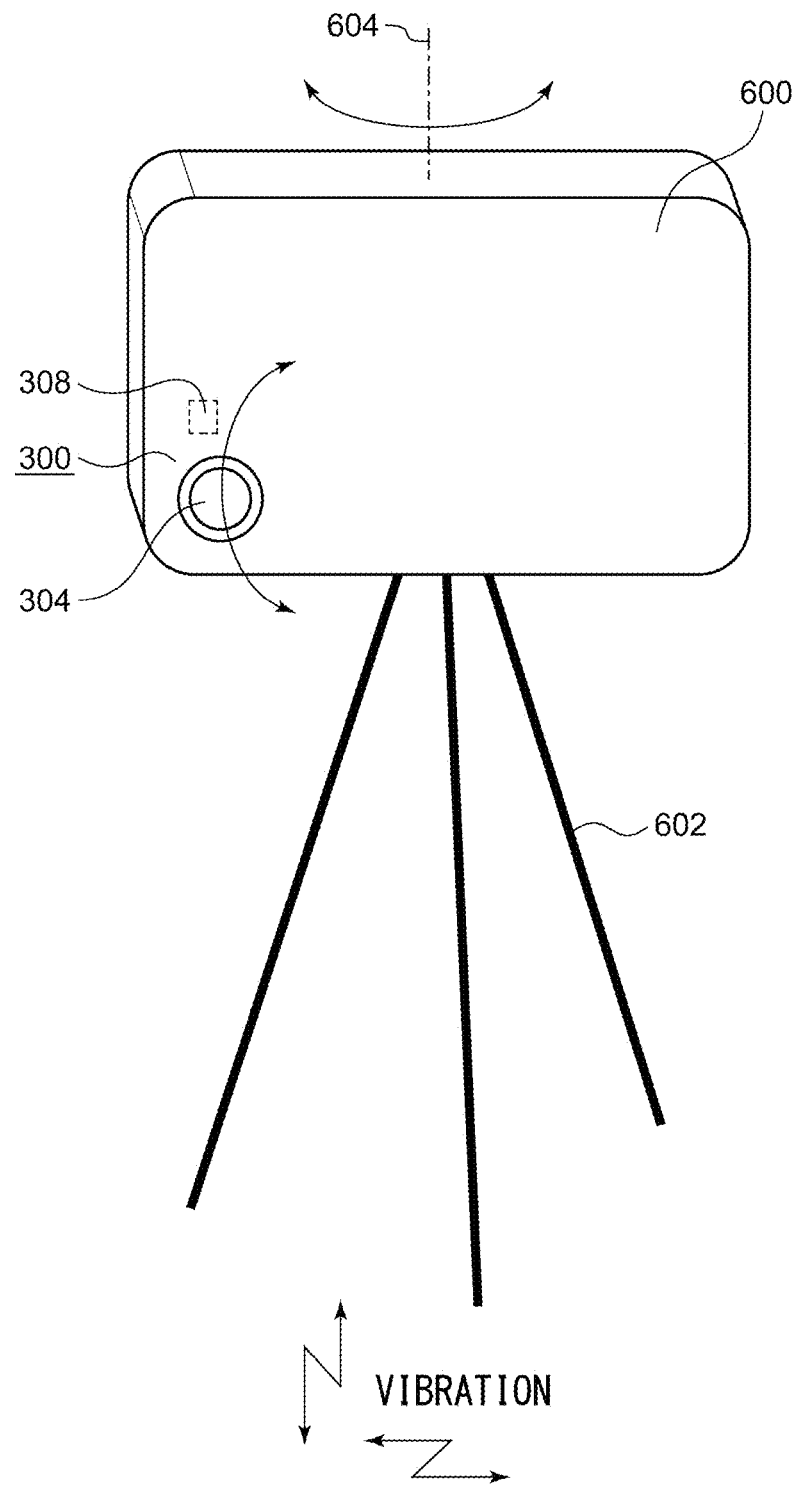
FIG. 7 is a diagram showing an example of a situation in which external disturbance vibration occurs.

FIG. 7 is a diagram showing an example of a situation in which external disturbance vibration occurs. As an example, FIG. 7 shows a case in which the image capture apparatus is affected by vibration from the ground after it is fixed by means of a tripod.

FIG. 7 shows a state in which an electronic device 600 such as a smartphone is fixed by means of a tripod 602. In some cases, depending on the rigidity of the tripod itself, rotational vibration occurs in the tripod 602 around a center axis 604 of the three legs. Examples of vibration sources include the ground where there is a large traffic volume, the body of a train in motion, and the like. The electronic device 600 is affected by vibration from the place where the tripod is installed. When the electronic device 600 rotationally moves around the center axis 604 as shown in FIG. 7, this leads to circular arc motion of the image capture apparatus 300 positioned eccentrically from the center axis 604. In some cases, such circular arc motion leads to the occurrence of acceleration applied to the lens 304 in the optical-axis direction. The acceleration sensor 308 is preferably arranged in the vicinity of the image capture apparatus 300 as much as possible. Such an arrangement is capable of detecting the acceleration in the optical-axis direction due to the circular arc motion. In a case in which the acceleration sensor is arranged in the vicinity of the center axis 604, such an arrangement provides almost no function of detecting the acceleration in the optical-axis direction.

In a state in which the acceleration sensor 308 detects acceleration due to external disturbance vibration in the situation as described above, inertial force occurs so as to position the movable portion 303 including the lens 304. If such a displacement of the lens 304 occurs in an actual operation, this has the potential to cause blurred focus. In order to solve such a problem, a thrust force is generated so as to cancel out the inertial force due to the acceleration thus detected, thereby suppressing the occurrence of vibration in the lens 304. By applying such correction in a real-time manner, this arrangement is capable of preventing deviation of the lens even if high-frequency external disturbance vibration occurs.

Description has been made above regarding an example in which the image capture apparatus is fixed by means of the tripod. In addition, there are several conceivable examples in which the image capture apparatus is affected by acceleration due to external disturbance vibration. For example, in a case in which the image capture apparatus is mounted on a vibrating body such as a vibration exciter, even in a case in which slow vibration is applied so as to generate almost no acceleration, in some cases, the high-frequency component of vibration applied by the vibration exciter leads to large acceleration. In this case, such an inertial force is preferably canceled out so as to prevent deviation of the lens. Also, in a case in which the image capture apparatus is fixedly mounted on a belt conveyor or the like that moves at a constant speed, in some cases, acceleration is applied to the image capture apparatus due to sudden jamming, a high-frequency component of the vibration, or the like. In such cases, such an inertial force is preferably canceled out so as to prevent the deviation of the lens.

As described above in the two embodiments, by employing the technique according to the present invention, this arrangement is capable of preventing deviation of the lens due to the inertial force applied to the lens that occurs due to acceleration due to external disturbance vibration, in addition to preventing deviation of the lens position due to the change in the direction of gravitational force (change in the orientation). This arrangement provides improved tolerance with respect to lens position deviation due to external force.

It should be noted that description has been made in the embodiment regarding an arrangement in which the actuator driver IC 500 supports the correction in order to reduce the effects of the acceleration $\alpha_Z$ as an internal function. However, the present invention is not restricted to such an arrangement. Also, instead of inputting the acceleration detection signal ACC thus detected by the acceleration sensor 308 to the actuator driver IC 500, the acceleration detection signal ACC may be input to the processor 306. Also, the processor 306 may calculate the condition for generating the thrust force (necessary current value or the like) to be used to correct the inertial force as an internal function.

It should be noted that description has been made regarding an arrangement in which the actuator 402 is configured as a voice coil motor. However, the present invention is not restricted to such an arrangement. Also, the present invention may be applied to a piezo actuator, a shape memory alloy actuator, or the like. It should be noted that the piezo actuator provides a guide structure with large friction, and accordingly, in a case in which only small acceleration is applied, this does not lead to the occurrence of position deviation. In a case in which a shape memory alloy actuator is employed, this arrangement allows a feedback control operation using the detection value of the resistance thereof. Accordingly, in many cases, such arrangements exhibit high tolerance with respect to lens position deviation even if the technique according to the present invention is not employed. That is to say, as the most effective application, the present invention is preferably applied to a voice coil motor.

Description has been made regarding an arrangement in which the actuator 402 has no position detection mechanism, and the actuator driver IC 500 supports a feedforward control operation. However, the present invention is not restricted to such an arrangement. Also, the present invention may be applied to an arrangement in which the actuator 402 has a position detection mechanism, and the actuator driver IC 500 supports a feedback control operation. It should be noted that, in a case of employing a feedback control operation, such a system is capable of suppressing position deviation that is represented as an error signal. In many cases, such a system exhibits improved tolerance with respect to lens position deviation due to external force even if the technique according to the present invention is not applied. That is to say, as the most effective application, the present invention is preferably applied to a system employing a feedforward control operation.

Second Embodiment

Description has been made in the first embodiment regarding the correction of an external force in an autofocus control operation. Also, the present invention may be applied to an image stabilization system.

Figure 8:
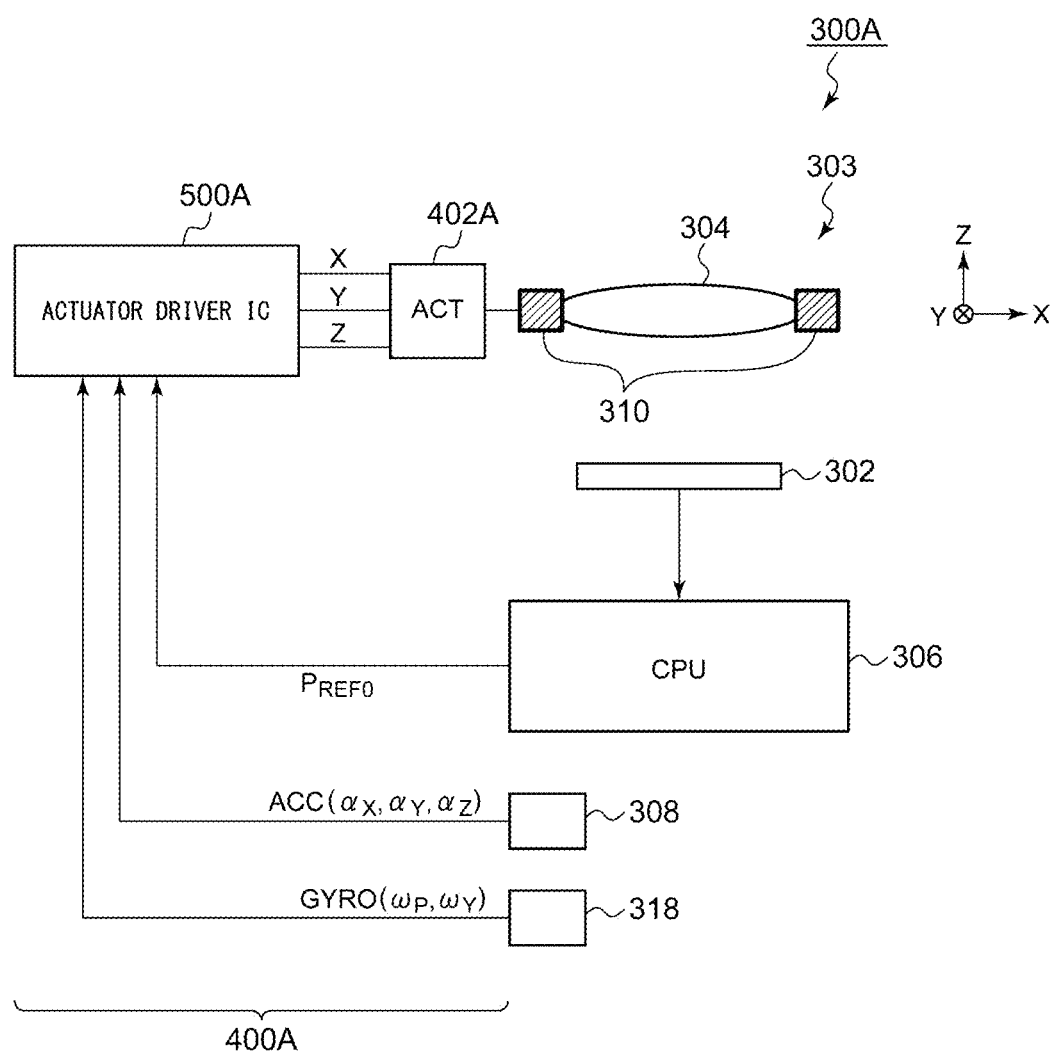
FIG. 8 is a diagram showing an image capture apparatus according to a second embodiment.

FIG. 8 is a diagram showing an image capture apparatus 300A according to a second embodiment. Description will be made regarding the configuration of the image capture apparatus 300A directing attention to the points of difference from the image capture apparatus 300 shown in FIG. 1. The image capture apparatus 300A includes an image stabilization function in addition to an autofocus function. An actuator 402A is configured to support positioning of the movable portion 303 in two directions (X-axis direction and Y-axis direction) that are each orthogonal to the optical-axis direction (Z-axis direction) independently of and in addition to the optical-axis direction. Specifically, the actuator 402A includes an X-direction coil and a Y-direction coil (not shown) for an OIS function.

The image capture apparatus 300A includes a gyro sensor 318 in addition to the configuration of the image capture apparatus 300 shown in FIG. 1. The gyro sensor 318 detects an angular speed $\omega_P$ around the pitch axis (X-axis) and an angular speed $\omega_Y$ around the yaw axis (Y-axis). The angular speed information GYRO that indicates the angular speeds $\omega_P$ and $\omega_Y$ is transmitted to the actuator driver IC 500A.

The actuator driver IC 500A integrates each of the angular speeds $\omega_P$ and $\omega_Y$ such that they are converted into shake angle information $\theta_P$ and $\theta_Y$. Furthermore, the actuator driver IC 500A positions the movable portion 303 in the Y-axis direction so as to cancel out the shake angle information $\theta_P$, and positions the movable portion 303 in the X-axis direction so as to cancel out the shake angle information $\theta_Y$. It should be noted that description is being made assuming that the actuator driver IC 500A supports an open-loop control operation with respect to the X-axis direction and the Y-axis direction.

The acceleration sensor 308 detects the acceleration rates $\alpha_X$ and $\alpha_Y$ in the X-axis direction and the Y-axis direction in addition to the acceleration in the Z-axis direction. The actuator driver IC 500A corrects the driving current for the Y axis based on the acceleration rate $\alpha_Y$ thus detected so as to reduce the effects of gravitational force or inertial force in the Y-axis direction. Similarly, the actuator driver IC 500A corrects the driving current for the X axis based on the acceleration rate $\alpha_X$ thus detected so as to reduce the effects of gravitational force or inertial force in the X-axis direction. The correction for the driving currents (i.e., forces to be generated by the actuator) in the X-axis direction and the Y-axis direction is designed in the same way as that described in the first embodiment relating to the autofocus function.

Figure 9:
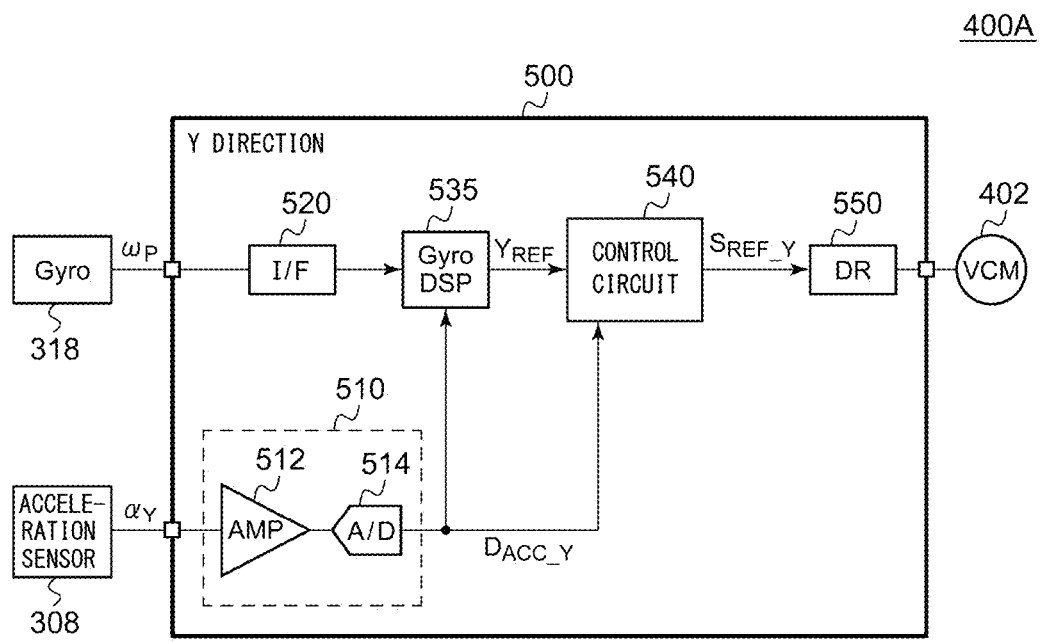
FIG. 9 is a block diagram showing a lens control apparatus including an actuator driver IC according to the second embodiment.

FIG. 9 is a block diagram showing a lens control apparatus 400A including the actuator driver IC 500A according to the second embodiment. FIG. 9 shows only a configuration relating to the image stabilization for the Y axis. A signal that indicates the angular speed $\omega_P$ around the pitch axis (X axis) is input from the gyro sensor 318. An interface circuit 520 receives this signal. A gyro DSP (Digital Signal Processor) 535 integrates the angular speed $\omega_P$ such that it is converted into the shake angle information $\theta_P$. The target position $Y_{REF0}$ of the movable portion 303 in the Y-axis direction can be calculated based on the shake angle information $\theta_P$, which is required to cancel out the shake angle $\theta_P$.

The acceleration detection unit 510 converts an analog signal that indicates the acceleration $\alpha_Y$ in the Y-axis direction into a digital value $D_{ACC\_Y}$. The gyro DSP 535 receives the digital value $D_{ACC\_Y}$, and calculates a double-integration of the digital value $D_{ACC\_Y}$ thus received, such that the digital value $D_{ACC\_Y}$ is converted into the position information $\Delta Y$ in the Y-axis direction. Here, $\Delta Y$ represents the deviation (translational shake) from the reference position. The gyro DSP 535 adds the deviation value $\Delta Y$ to the target value $Y_{REF0}$ calculated based on the angular speed $\theta_P$, thereby determining the target position $Y_{REF}$ to be set for the movable portion 303.

The control circuit 540 calculates the base current $I_0$ based on the target position $Y_{REF}$. Furthermore, the control circuit 540 calculates the current value (correction current value) $I_{CMP\_Y}$ such that the actuator 402 generates a thrust force so as to cancel out a force (inertial force and gravitational force) that occurs at the movable portion 303 due to the acceleration $\alpha_Y$. Subsequently, the control circuit 540 inputs the current value $S_{REF\_Y}$ obtained by superimposing the correction current $I_{CMP\_Y}$ on the base current value $I_0$ to the driver 550. The driver 550 drives the actuator 402 according to the current value $S_{REF\_Y}$ thus calculated. Image stabilization in the X-axis direction is supported in the same manner.

Figure 10A:
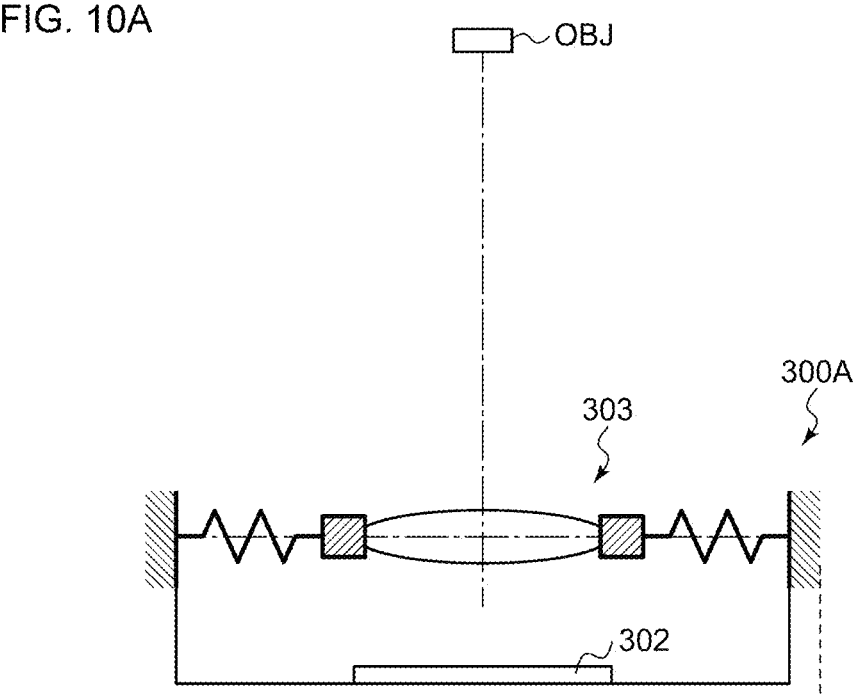
FIG. 10A and FIG. 10B are diagrams for explaining translational shake.
Figure 10B:
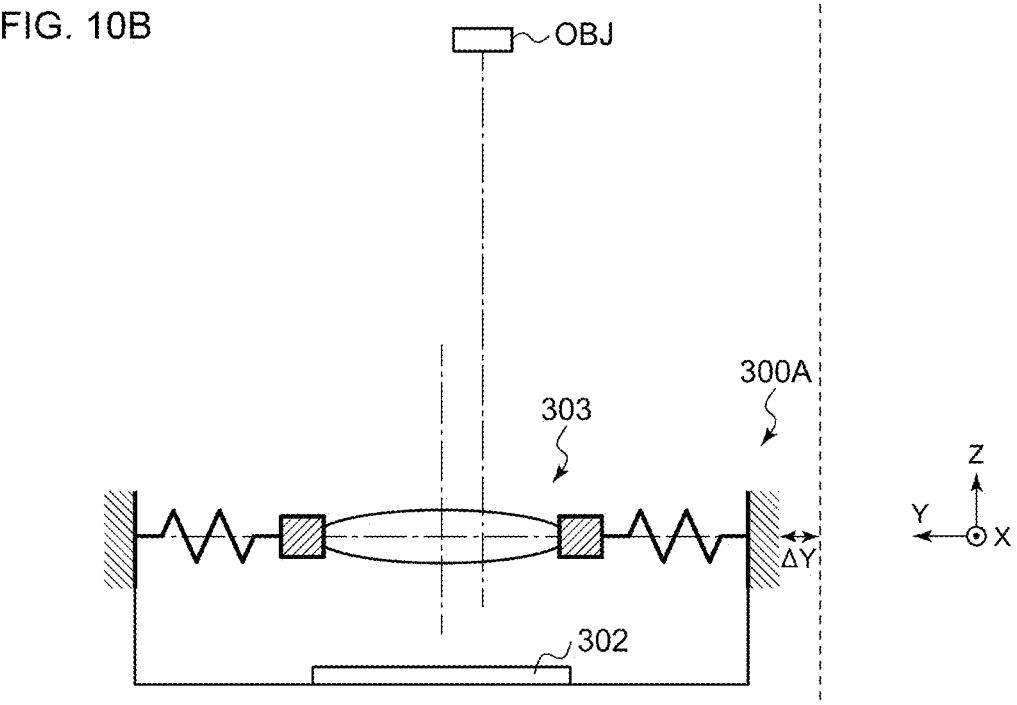

FIGS. 10A and 10B are diagrams for explaining translational shake. FIG. 10A shows a state in which there is no translational shake. FIG. 10B shows a state in which, due to translational shake, position deviation of $\Delta Y$ occurs in the overall image capture apparatus 300A itself toward the negative side in the Y-axis direction. There is a difference in the location at which the image of the object OBJ is formed on the image sensor 302 between the states shown in FIGS. 10A and 10B. With the image capture apparatus 300A shown in FIG. 8, the target position $Y_{REF}$ is calculated giving consideration to the translational shake $\Delta Y$ in the Y-axis direction, thereby appropriately suppressing such translational shake.

Figure 11A:
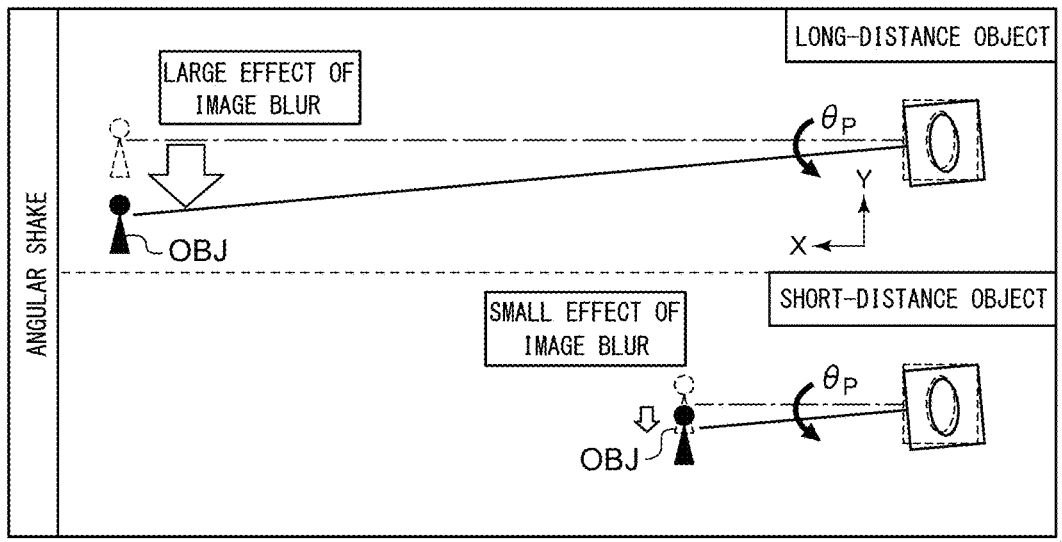
FIG. 11A and FIG. 11B are diagrams for explaining angular shake and translational shake.
Figure 11B:
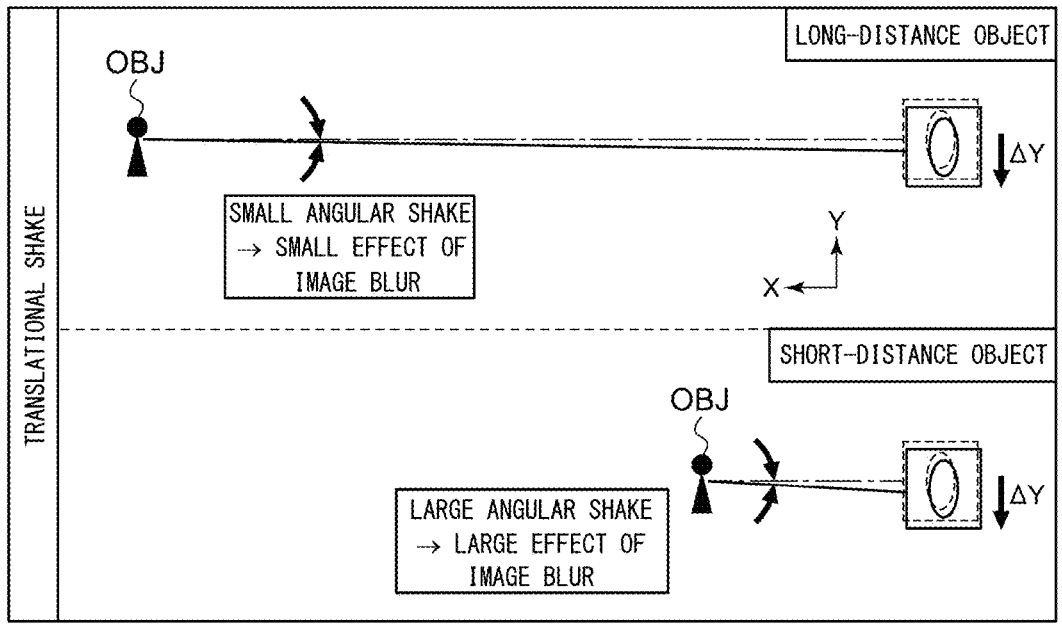

FIGS. 11A and 11B are diagrams for explaining angular shake (rotational shake) and translational shake. FIG. 11A shows rotational shake around the pitch axis (X axis). FIG. 11B shows translational shake in the Y-axis direction. As the distance up to the object OBJ becomes larger, the effect of angular shake becomes marked. Conversely, as the distance up to the object OBJ becomes smaller, the effect of translational shake becomes marked.

When the object OBJ is in focus, the target position $Z_{REF}$ in the Z-axis direction (i.e., the focal length) has a correspondence with the distance up to the object OBJ. Accordingly, the correction weighting relation between translational shake correction and angular shake correction may preferably be changed according to the focal length.

It should be noted that, typically, in many cases, such an image stabilization correction system includes a position detection mechanism and employs a feedback control operation. In many cases, such an arrangement provides improved tolerance with respect to lens position deviation due to external force even if the technique according to the present invention is not employed. However, in some cases, such an image stabilization correction system employs an open-loop control operation. In this case, the present invention is effectively applied to such an image stabilization system.

The present specification discloses the following technique.

An embodiment of the present invention relates to an image capture apparatus. The image capture apparatus includes: an image sensor; a lens arranged on an incident light path along which incident light is to be input to the image sensor; an actuator that positions a movable portion including the lens; an acceleration detection unit that detects the acceleration applied to the image capture apparatus; and an actuator driver that controls the actuator. The actuator driver controls the actuator so as to cancel out inertial force that occurs at the movable portion due to the acceleration or the effects of gravitational force based on the acceleration information detected by the acceleration detection unit.

With such a configuration as described above, this arrangement is capable of preventing the occurrence of position deviation in the lens due to inertial force applied to the lens due to acceleration that occurs due to external disturbance vibration in addition to preventing deviation of the lens position due to a change in gravitational force direction (change in orientation). This arrangement provides improved tolerance with respect to lens position deviation due to external force.

Also, the image capture apparatus according to the present invention may have no position detection mechanism for detecting the position of the movable portion. Also, as the control operation employed in the actuator driver, such an arrangement may employ a feedforward control operation for controlling the position of the movable portion using an open-loop control method.

In a case in which the image capture apparatus includes a position detection mechanism and employs a feedback control operation, by controlling the position such that the position signal thus detected is maintained at a constant level, this arrangement is capable of providing improved tolerance with respect to lens position deviation due to external force. However, even in a case in which the image capture apparatus includes no position detection mechanism and employs a feedforward control operation, by employing the configuration as described above, this arrangement is capable of providing improved tolerance with respect to lens position deviation due to external force. This provides dramatically improved effects.

Also, with the image capture apparatus according to the present invention, the actuator is capable of driving the lens in the optical-axis direction. The actuator driver may control the actuator based on the acceleration component in the optical-axis direction detected by the acceleration detection mechanism so as to cancel out the inertial force in the optical-axis direction that occurs at the movable portion due to the acceleration.

In some cases, the actuator supports image stabilization correction. In many cases, a feedback control operation is employed in order to provide image stabilization correction. In contrast, in many cases, in a case in which the lens position is controlled in order to provide an autofocus function, a feedforward control operation is employed. Even if the image capture apparatus has no detection mechanism for detecting the position of the lens in the optical-axis direction, by employing the configuration as described above, this arrangement is capable of providing improved tolerance with respect to lens position deviation in the optical-axis direction due to external force.

Another embodiment of the present invention relates to an actuator driver. The actuator driver is mounted on an image capture apparatus including an actuator configured to position a movable portion including a lens. The actuator driver is configured to control the actuator. The image capture apparatus includes an acceleration detection mechanism that detects the acceleration applied to the image capture apparatus. The actuator driver controls the actuator based on the acceleration information detected by the acceleration detection mechanism so as to cancel out the inertial force that occurs at the movable portion due to the acceleration.

With such an embodiment, this arrangement is capable of preventing the occurrence of position deviation in the lens due to inertial force applied to the lens due to acceleration that occurs due to external disturbance vibration in addition to preventing deviation of the lens position due to a change in gravitational force direction (change in orientation). This provides improved tolerance with respect to lens position deviation due to external force.

The image capture apparatus may include no detection mechanism for detecting the position of the movable portion. As the control operation of the actuator driver, this arrangement may employ a feedforward control operation for controlling the position of the movable portion in an open-loop manner.

The actuator may be configured to drive the lens in the optical-axis direction. Also, the actuator driver may control the actuator based on the acceleration component in the optical-axis direction detected by the acceleration detection mechanism so as to cancel out the inertial force in the optical-axis direction that occurs at the movable portion due to the acceleration.

While the preferred embodiments of the present invention have been described using specific terms, such description is for illustrative purposes only, and it is to be understood that changes and variations may be made without departing from the spirit or scope of the appended claims.

What is claimed is:

1. An image capture apparatus comprising:
   an image sensor;
   a lens arranged on an incident light path to the image sensor;
   an actuator structured to position a movable portion comprising the lens in a first direction and a second direction perpendicular to the first direction;
   an acceleration detection unit structured to generate first acceleration information that indicates an acceleration applied to the image capture apparatus in the first direction and to generate second acceleration information that indicates an acceleration applied to the image capture apparatus in the second direction; and
   an actuator driver structured to superimpose a first correction value that corresponds to the first acceleration information on a first base instruction value that corresponds to a target position to be set for the lens in the first direction so as to generate a first corrected instruction value, to superimpose a second correction value that corresponds to the second acceleration information on a second base instruction value that corresponds to a target position to be set for the lens in the second direction so as to generate a second corrected instruction value, and to control the actuator according to the first corrected instruction value and the second corrected instruction value.

2. The image capture apparatus according to claim 1, wherein the actuator driver is controlled in an open-loop control manner.

3. The image capture apparatus according to claim 1, wherein the first direction and the second direction are orthogonal to each other, and are each orthogonal to the optical axis of the lens.

4. An actuator driver to be mounted on an image capture apparatus, wherein the image capture apparatus comprises:
   an image sensor;
   a lens arranged on an incident light path to the image sensor;
   an actuator structured to position a movable portion comprising the lens in a first direction and a second direction; and
   an acceleration detection unit structured to generate first acceleration information that indicates an acceleration applied to the image capture apparatus in the first direction and to generate second acceleration information that indicates an acceleration applied to the image capture apparatus in the second direction,
   and wherein the actuator driver comprises:
   a control circuit structured to superimpose a first correction value that corresponds to the first acceleration information on a first base instruction value that corresponds to a target position to be set for the lens in the first direction, so as to generate a first corrected instruction value, and to superimpose a second correction value that corresponds to the second acceleration information on a second base instruction value that corresponds to a target position to be set for the lens in the second direction, so as to generate a second corrected instruction value; and
   a driving unit structured to control the actuator according to the first corrected instruction value and the second corrected instruction value.

5. The actuator driver according to claim 4, wherein the first base instruction value and the second base instruction value are generated by means of an open-loop control operation.

6. The actuator driver according to claim 4, wherein the first direction and the second direction are orthogonal to each other, and are each orthogonal to the optical axis of the lens.

* * * * *